United States Patent
Yea et al.

(10) Patent No.: US 8,315,426 B2
(45) Date of Patent: Nov. 20, 2012

(54) METHOD FOR HANDLING PIXEL OCCLUSIONS IN STEREO IMAGES USING ITERATIVE SUPPORT AND DECISION PROCESSES

(75) Inventors: Sehoon Yea, Seoul (KR); Dongbo Min, Daejeon (KR); Anthony Vetro, Arlington, VA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 417 days.

(21) Appl. No.: 12/723,324

(22) Filed: Mar. 12, 2010

(65) Prior Publication Data

US 2011/0222756 A1 Sep. 15, 2011

(51) Int. Cl.
  *G06K 9/00* (2006.01)
(52) U.S. Cl. ........ 382/100; 382/154; 382/294; 382/173; 345/426; 345/427; 348/140

(58) Field of Classification Search .................. 382/100, 382/154, 294, 173; 348/140; 345/426, 427
  See application file for complete search history.

(56) References Cited

U.S. PATENT DOCUMENTS

| | | | |
|---|---|---|---|
| 6,763,125 B2 * | 7/2004 | Ohta | 382/104 |
| 7,440,618 B2 * | 10/2008 | Ohara et al. | 382/193 |
| 7,505,841 B2 * | 3/2009 | Sun et al. | 701/45 |

* cited by examiner

*Primary Examiner* — Mike Rahmjoo
(74) *Attorney, Agent, or Firm* — Dirk Brinkman; Gene Vinokur

(57) ABSTRACT

In stereo images that include occluded pixels and visible pixels, occlusions are handled by first determining, for the occluded pixels, initial disparity values and support for the initial disparity values using an initial support function, an occlusion map and disparities of the visible pixels neighboring the occluded pixels in the stereo images. Then, for the occluded pixels, final disparity values and support for the final disparity values are determined using the initial disparity values, a final support function and a normalization function in an iterative support-and-decision process.

16 Claims, 3 Drawing Sheets

METHOD FOR HANDLING PIXEL OCCLUSIONS IN STEREO IMAGES USING ITERATIVE SUPPORT AND DECISION PROCESSES

FIELD OF THE INVENTION

This invention relates generally to stereo matching, and more specifically to handling occlusions in stereo images.

BACKGROUND OF THE INVENTION

Occlusion handling is an important and challenging problem in computer vision and 3D image processing, especially with regards to correspondence problems in stereo, and motion analysis.

For stereo images, occluded pixels are usually only visible in one of the stereo image so it is impossible to estimate the corresponding pixels in the other image. However, reasonable disparity values need to be assigned to the occluded pixels to ensure high-quality image-based rendering and 3D modeling.

To handle occlusions in stereo images, there exist various constraints that could be leveraged based on the 3D geometry. For instance, dynamic programming has been used to estimate disparity and occlusion maps by utilizing an ordering constraint. That approach is very efficient but the ordering constraint is not valid when an image includes a relatively thin object, i.e., an object with a width of only a small number of pixels.

Many approaches have been described to estimate the disparity of the occluded pixels by combining a uniqueness constraint into a global optimization method, and assigning a predefined penalty to the occluded pixels. The disparities of occluded pixels have also been estimated by extrapolation, where the disparities of visible pixels are simply extended into the occluded region. However, that method is not reliable because the geometric order of occluded pixels can be not valid due to errors in the disparity map.

There are also segmentation-based occlusion handling methods that assign the disparities to occluded pixels by performing a plane-fitting with disparities of visible pixels in partly visible segments.

Another method combines the occlusion problem into the cost aggregation scheme using a weighted least squares solution. That method only uses the left disparity field to detect occluded pixels and the geometric order of occlusion is utilized. One drawback of that scheme is that the computational complexity can be high because the method performs a sequential nonlinear filtering on each cost domain repeatedly.

SUMMARY OF THE INVENTION

The embodiments of the invention provide a method for handling occluded pixels in stereo images based on a probabilistic voting framework that utilizes a novel support-and-decision process. The occlusion handling method assigns a disparity value to occluded pixels in disparity maps.

In an initial step, disparities and a corresponding support of each occluded pixel is determined using a probabilistic voting method using the disparities at visible pixels. In this way, the pixel information is propagated when the disparity and support at each occluded pixel is determined. The final disparities for occluded pixels are then determined through an iterative support-and-decision process to propagate the information inside the occluded pixel region.

An acceleration technique is also described to improve the performance of the iterative support-and-decision process.

DETAILED DESCRIPTION OF THE PREFERRED EMBODIMENTS

System Overview

Figure 1B:
FIGS. 1A-1B respectively are occlusion maps for left and right stereo images used by embodiments of the invention.
Figure 1A:

Left and right occlusion map are determine from left and right disparity maps, e.g., the maps shown in FIGS. 1A-1B. In the Figures, the white regions indicate visible pixels and the black regions indicate occluded pixels. The occlusion maps can be determined using a conventional cross-checking method.

The embodiments of the invention assign disparity values to the occluded pixels. Occlusion detection is not specifically addressed by this invention, and any prior art method can be used for that purpose.

The method can be performed in a processor 200 connected to a memory and input/output interfaces as known in the art. It is also understood that processing millions of pixels in stereo images cannot performed mentally.

Methods are known for assigning assign disparity values to the occluded pixels, e.g., using global optimization or by applying geometric constraints that occluded pixels are likely to have similar disparity values as visible pixels in the background. However, the prior art methods are not always accurate.

Figure 2:
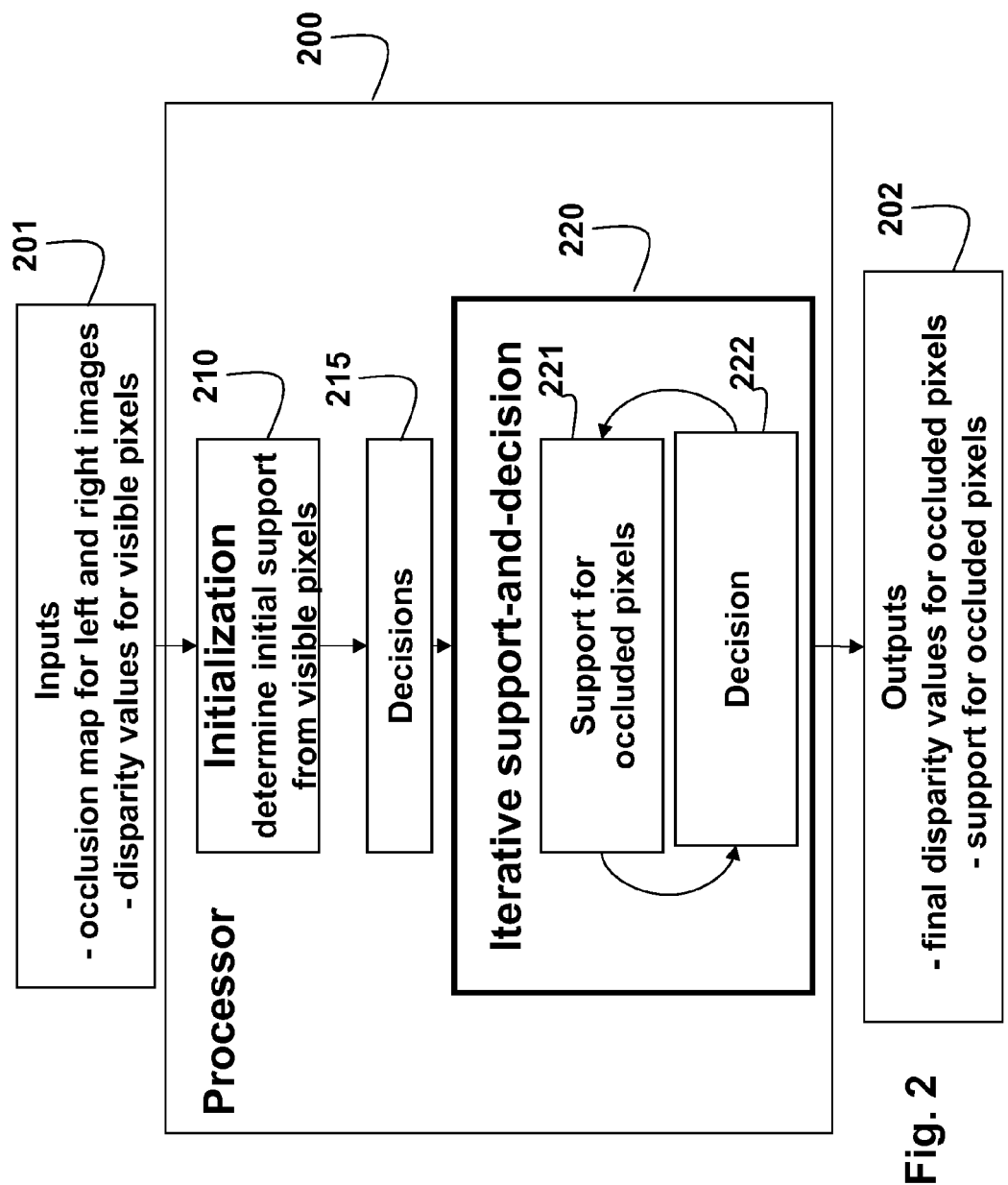
FIG. 2 is a block diagram of a method for handling occlusions according to embodiments of the invention.

As shown in FIG. 2, the occlusion handling process can be partitioned into two steps: initialization 210, and an iterative support-and-decision process 220. The process 220 include determining 221 the support for the occlude pixels, and a decision step 222.

The inputs 201 to the method are the disparity values for visible pixels and the occlusion maps for the left and right stereo images. The outputs 202 are final disparity values for the occluded pixels and the support for disparity values pixels.

During initialization 210, the disparity and corresponding support of for the occluded pixels determined using disparities of neighboring visible pixels to produce decisions 215. In this way, the visible pixel information is propagated into an occluded region.

The iterative support-and-decision process determines the final disparity and corresponding support for the occluded pixels. The iterative process is somewhat similar to the initial process, except that the process 220 uses its own support for occluded pixels, and performs a normalization of the support value for each occluded pixel.

Because the occlusion handling step is the same for the left and right disparity maps, we describe the method for only one of the stereo images.

Initial Support Function

According to the method described in this invention, a support function for handling occlusion in a probabilistic voting framework is defined. The initial support function represents likelihood that an occluded pixel has a specific disparity value among a set of initial disparity candidates. The initial support function S(m, d) is defined as follows:

$$S(m, d) \propto \sum_{n \in N(m)} p(m, n) f(d, d(n)) o(n) \quad (1)$$

$$f(d, d(n)) = \begin{cases} 1 & \text{if } d = d(n) \\ 0 & \text{otherwise} \end{cases}$$

$$o(n) = \begin{cases} 1 & \text{visible} \\ 0 & \text{otherwise} \end{cases},$$

where p(m, n) represents the probability that pixels m and n have identical disparity values, d is an initial disparity candidate and d(n) is the disparity of visible pixel n. A set of N neighboring pixels are used when determining the initial support function, and o(n) is a visibility function. Note that the initial support function is determined for occluded pixels only, i.e., when o(m)=0 in Eq. (1).

Figure 3:
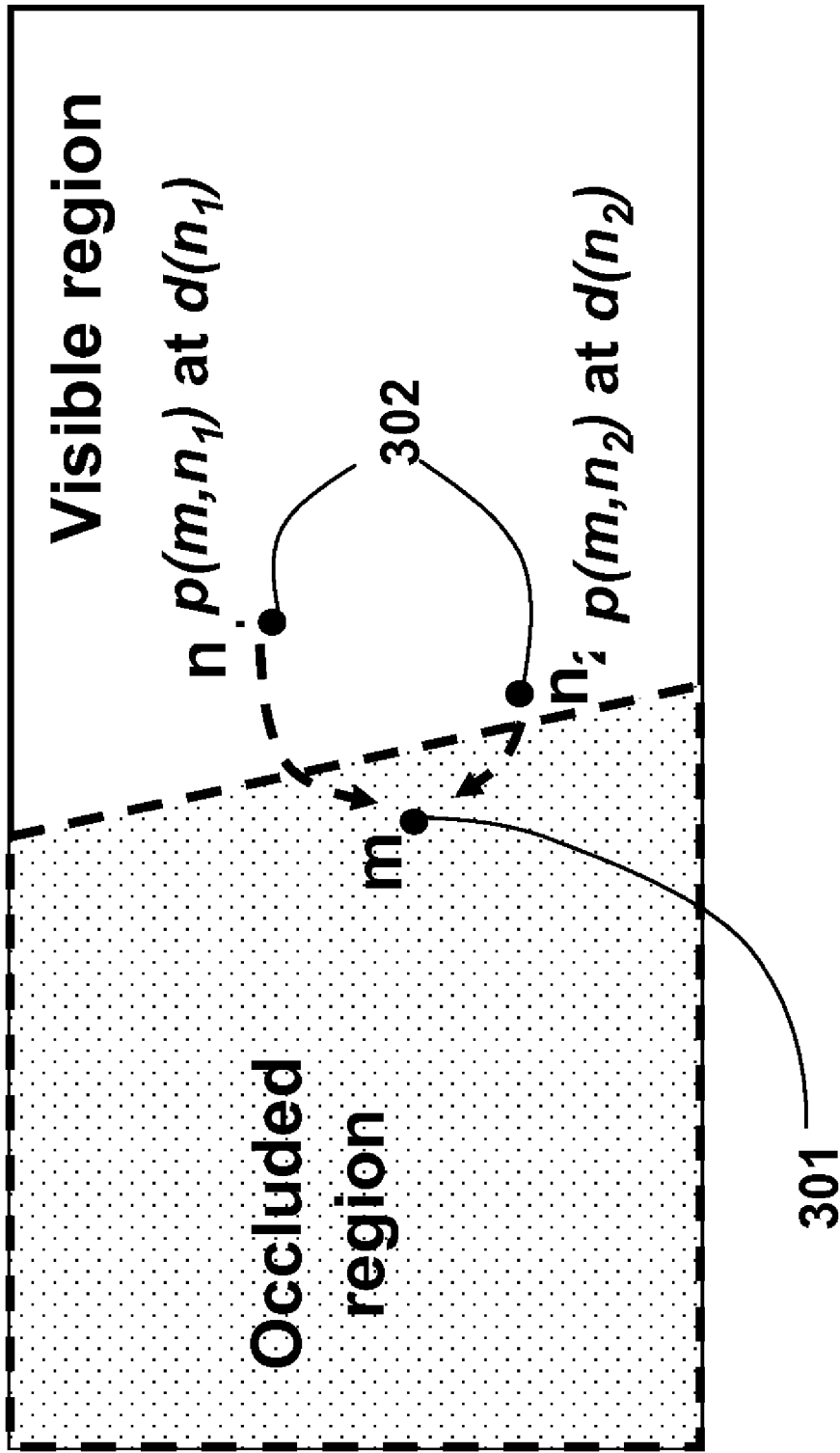
FIG. 3 is a schematic of a computation of a support function in a probabilistic framework according to embodiments of the invention.

FIG. 3 schematically shows the process that determine the support at pixel m using the disparities of the visible pixels and their probability values. For each occluded pixel 301, neighboring visible pixels 302 "vote" for the disparity candidate, which corresponds to their disparity values, d(n) at the occluded pixel m proportional to the probability that the occluded and the neighboring visible pixels have the same disparity value. In other words, the occluded pixel has a larger support when there are more neighboring visible pixels with high probability.

Initialization

In order to define the probability function p(m, n) between visible and occluded pixels, we assume that depth discontinuities are likely to correspond to color discontinuities, i.e., the neighboring pixels with similar color usually have similar disparity values.

This assumption has been widely used in correspondence problems, such as stereo matching and motion estimation. Accordingly, we define a weighting function w that is proportional to a probability function $$p(m, n) \propto w(m, n) = \exp\left(-\frac{D(m, n)}{\sigma_S^2} - \frac{D(I_m, I_n)}{\sigma_I^2}\right) \quad (2)$$

where α is a proportional symbol, w(m, n) is a Gaussian distance function, which includes both geometric and color distances, D(,) represents a Euclidean distance, I is a three-dimensional color vector with RGB components in our invention, although other color spaces can also be used, and $\sigma_S^2$ and $\sigma_I^2$ are weighting constants for the geometric and color distances, respectively.

Using Eq. (2), the initial support function $S_{INI}$ can be defined as follows:

$$S_{INI}(m, d) = \sum_{n \in N(m)} w(m, n) f(d, d(n)) o(n) \quad (3)$$

As described above, the initial support function $S_{INI}$ is determined using the disparities of the visible pixels. The weighting function w, which is proportional to the probability function, helps to localize discontinuities, similar to bilateral filtering and anisotropic diffusion filtering. For accurate occlusion handling, it is also required to gather sufficient support from visible pixels to decide the initial disparity and support for each occluded pixel.

Using the initial support function $S_{INI}$ the initial disparities and the corresponding supports can be determined as follows:

$$d(m) = \operatorname*{argmax}_{d} S_{INI}(m, d) \quad (4)$$

$$S(m) = S_{INI}(m, d(m))$$

wherein the function $$\operatorname*{argmax}_{d}$$

returns a maximum among the set of initial disparity candidates.

The support function S represents the reliability of the initial disparity determined for the occluded pixels. Because the initial support function $S_{INI}$ is determined using the disparity of neighboring visible pixels, the maximum value S of the initial support function represents a likelihood that the occluded pixel m has the disparity d(m).

According to Eqs. (2-4), the initial support of the occlusion handling method described determines the initial disparity values based on a weighted sum of probabilities, i.e., corresponding weights, that indicate the likelihood that the disparities of neighboring pixels are equal to a set of initial disparity candidates of occluded pixels, where the weights are based on a distance and a similarity of intensity values of the visible pixels.

The support values of the occluded pixels determine the reliability of the initial disparities at the occluded pixels. The final disparity and the corresponding support values are then determined by propagating the disparity values and the support values between the occluded pixels in the iterative support-and-decision process 220.

Iterative Support-and-Decision Process

The disparity and support values obtained in the initial support-and-decision process 210 are used to propagate information from the visible pixels to the occluded pixels. While the initialization relies exclusively on disparities of the visible pixels, the iterative support-and-decision process uses information from the occluded pixels.

The iterative support-and-decision process is similar to the initial process, except the iterative process determines its own support for occluded pixels, and performs normalization of the support values for the occluded pixel during each iteration.

A final support function and a normalization functions at the occluded pixels can be determined as follows $$S_{INT}^{t+1}(m, d) = \sum_{n \in N(m)} w(m, n) S^t(n) f(d, d(n))(1 - o(n)) \quad (5)$$

$$W(m, d) = \sum_{n \in N(m)} w(m, n) f(d, d(n))(1 - o(n))$$

where $S^t(n)$ represents the final support function at the $t^{th}$ iteration. We initialize $S^0(n)$ using S(n), and an intermediate unnormalized support function is $$S_{INT}^{t+1}(m, d),$$

Therefore, the disparity function and the final support function are determined as follows.

$$d^{t+1}(m) = \arg\max_{d} S_{INT}^{t+1}(m, d) \quad (6)$$

$$S^{t+1}(m) = S_{INT}^{t+1}(m, d^{t+1}(m)) / W(m, d^{t+1}(m))$$

The final support $S^{t+1}(m)$ at the $(t+1)^{th}$ iteration is normalized by the weight W. The normalization process is needed to preserve the sum of the support values during the iterations of the support-and-decision process. The total sum of the support values that are determined in the initial support-and-decision process are maintained in the iterative filtering process, similar to the edge-preserving filtering methods such as bilateral filtering and non-local means filtering.

In one embodiment of the invention, the number of iterations is predetermined. This would be useful for implementations that require fixed processing and timing constraints.

In another embodiment of the invention, the number of iterations is determined by comparing the final disparity values of a current iteration with the final disparity values of a previous iteration. When a minimal change is detected, the process has converged.

In another embodiment of the invention, the number of iterations is determined according to the support values. In this way, a certain level of reliability would be reached on the final disparity values of the occluded pixels.

Acceleration Techniques

The method can be accelerated with numerical methods including the Gauss-Seidel method and a hierarchical scheme. The Gauss-Seidel method, also known as the Liebmann method, or the method of successive displacement. The method is a well known iterative method used to solve a linear system of equations. The hierarchical scheme uses images having different resolutions arranged in coarse to fine levels. The various resolutions can be obtained by successively downsampling the images.

For the Gauss-Seidel method, the updated support values for the occluded pixels are used immediately after they are determined in the iterative support-and-decision process.

We partition a set of neighbor pixels N(m) into a causal part $N_c(m)$ and a noncausal part $N_n(m)$. Using these two parts of N(m), the final support function in Eq. (5) can be expressed as follows.

$$S_{INT}^{t+1}(m, d) = \sum_{n \in N_c(m)} w(m, n) S^{t+1}(n) f(d, d(n))(1 - o(n)) + \quad (7)$$

$$\sum_{n \in N_n(m)} w(m, n) S^t(n) f(d, d(n))(1 - o(n)).$$

Another means to accelerate is to apply the method hierarchically. Because it is sometimes necessary to gather support information at a large distance to ensure reliable occlusion handling, the hierarchical scheme can efficiently propagate support information between the occluded pixels.

In the hierarchical method, a value that is close to an optimal support at each level is initialized by using the final value at a coarser level. In the first phase, the final support function at the coarsest level is initialized using S(m) in Eq. (4). The stereo images are also subsampled in order to determine weighting function w at each hierarchical level.

The iterative support-and-decision process 220 is then performed at each level. After T iterations, the resulting disparity function and final support functions are used to initialize the disparity function and final support functions at the finer level. Note that in this scheme, the upsampling step for the disparity function and final support functions is not performed because it is impossible to perform the upsampling step with the final support function of the occluded pixels having different disparity values.

EFFECT OF THE INVENTION

The embodiments of the invention provide a novel method for handling occlusion using a support-and-decision process. The method assigns disparity values to the occluded pixels using a support function that represents the likelihood of having a specific disparity value. Acceleration techniques are also described to reduce the complexity and to propagate the support information between the occluded pixels efficiently. Relative to prior art schemes, the method described in this invention has the advantage of its complexity being independent of the disparity search range.

We claim:
1. A method for handling occlusion in stereo images, wherein the stereo image includes occluded pixels and visible pixels comprising for each stereo image:
   determining, for each occluded pixel, an initial disparity value and a likelihood for each initial disparity value using an initial support function, an occlusion map and disparities of the visible pixels neighboring the occluded pixels in the stereo images, wherein the initial support function is a weighted sum of probabilities indicating a likelihood that the disparities of the visible pixels neighboring the occluded pixels are equal to the initial disparity value of the occluded pixel; and
   determining iteratively, for each occluded pixel, a final disparity value and a likelihood for each final disparity value using the initial disparity value, a final support function and a normalization function, wherein the final support function is a weighted sum of probabilities that indicate a likelihood that the initial disparity values of neighboring occluded pixels are equal to the final disparity value of the occluded pixels, wherein the steps are performed in a processor.

2. The method of claim 1, wherein the weighted sum of the initial support function, with corresponding weights, is based on a set of geometric distances and color distances between the occluded pixels and the neighboring visible pixels.

3. The method of claim 2, wherein the weights are determined by a Gaussian distance function, $$w(m, n) = \exp\left(-\frac{D(m, n)}{\sigma_S^2} - \frac{D(I_m, I_n)}{\sigma_I^2}\right),$$

where m is an index for the occluded pixels. n is an index for the neighboring visible pixels, D(,) represents a Euclidean distance, I is a three-dimensional color vector, and $\sigma^2_S$ and $\sigma^2_I$ are weighting constants for the geometric distances and the color distances, respectively.

4. The method of claim 1, wherein, the initial support function is $$S_{INI}(m, d) = \sum_{n \in N(m)} w(m, n) f(d, d(n)) o(n),$$

where w(m,n) is the weight corresponding to the occluded pixel m and the visible pixel n, f(d,d(n)) is a binary function that equals 1 when d equals d(n), and 0 otherwise, where d is the initial disparity candidate, and d(n) is the disparity of the visible pixel n in a neighborhood N(m), and o(n) is a binary function that equals 1 when the pixel n is visible and 0 otherwise.

5. The method of claim 1, wherein the initial disparity values, d(m), and the support for the initial disparity values, S(m), are determined as $$d(m) = \operatorname*{argmax}_{d} S_{INI}(m, d)$$

$$S(m) = S_{INI}(m, d(m)),$$

wherein the function $$\operatorname*{argmax}_{d}$$

returns a maximum among the set of initial disparity candidates.

6. The method of claim 1, wherein the weighted sum of the final support function, with corresponding weights, are based on a set of geometric distances and color distances between each occluded pixels and the neighboring occluded pixels.

7. The method of claim 6, wherein the weights are determined by a Gaussian distance function, $$w(m, n) = \exp\left(-\frac{D(m, n)}{\sigma_S^2} - \frac{D(I_m, I_n)}{\sigma_I^2}\right),$$

where m is an index for the current occluded pixel, n is an index for the neighboring occluded pixels, D(,) represents a Euclidean distance, I is a three-dimensional color vector, and $\sigma_S^2$ and $\sigma_I^2$ are weighting constants for the geometric distances and the color distances, respectively.

8. The method of claim 1, wherein the final support function is $$S_{INT}^{t+1}(m, d) = \sum_{n \in N(m)} w(m, n) S^t(n) f(d, d(n))(1 - o(n)),$$

where $S^t(n)$ represents the final support function at a $t^{th}$ iteration, wherein $S^0(n)$ is initialized using S(n), and an intermediate un-normalized support function is $$S_{INT}^{t+1}(m,d)$$

9. The method of claim 1, wherein the normalization function is:

$$W(m, d) = \sum_{n \in N(m)} w(m, n) f(d, d(n))(1 - o(n)).$$

10. The method of claim 1, wherein the final disparity values, $d^{t+1}(m)$ and the likelihood for the final disparity values, $S^{t+1}(m)$, are determined iteratively after (t+1) iterations as $$d^{t+1}(m) = \operatorname*{argmax}_{d} S_{INT}^{t+1}(m, d)$$

$$S^{t+1}(m) = S_{INT}^{t+1}(m, d^{t+1}(m)) / W(m, d^{t+1}(m))$$

where m is an index for the occluded pixels.

11. The method of claim 10, wherein a number of iterations is predetermined.

12. The method of claim 10, wherein the determining iteratively terminates when the final disparity values converge.

13. The method of claim 10, the determining iteratively depends on the likelihood.

14. The method of claim 1, wherein the method is accelerated using a Gauss-Seidel method.

15. The method of claim 1, wherein the method is applied to a hierarchy of images at different resolution.

16. The method of claim 15, further comprising:
partitioning a set of neighbor pixels N(m) into a causal part $N_c(m)$ and a noncausal part $N_n(m)$, and
expressing the final support function as $$S_{INT}^{t+1}(m, d) = \sum_{n \in N_c(m)} w(m, n) S^{t+1}(n) f(d, d(n))(1 - o(n)) + \sum_{n \in N_n(m)} w(m, n) S^t(n) f(d, d(n))(1 - o(n)).$$

* * * * *